US009239003B1

(12) United States Patent
Manke

(10) Patent No.: US 9,239,003 B1
(45) Date of Patent: Jan. 19, 2016

(54) VARIABLE VOLUME COMBUSTION CHAMBER SYSTEM

(71) Applicant: Donald W. Manke, Tucson, AZ (US)

(72) Inventor: Donald W. Manke, Tucson, AZ (US)

( * ) Notice: Subject to any disclaimer, the term of this patent is extended or adjusted under 35 U.S.C. 154(b) by 0 days.

(21) Appl. No.: 14/611,761

(22) Filed: Feb. 2, 2015

Related U.S. Application Data

(60) Provisional application No. 62/004,056, filed on May 28, 2014.

(51) Int. Cl.
*F02B 75/04* (2006.01)
*F02D 15/04* (2006.01)
*F01L 5/06* (2006.01)
*F01P 1/02* (2006.01)

(52) U.S. Cl.
CPC ............... *F02B 75/042* (2013.01); *F01L 5/06* (2013.01); *F01P 1/02* (2013.01); *F02D 15/04* (2013.01); *F01P 2001/026* (2013.01); *F02D 2700/03* (2013.01)

(58) Field of Classification Search
CPC ...... F02B 75/041; F02B 75/042; F02D 15/00; F02D 15/04; F02D 2700/03; F02D 2700/035; F01P 1/02; F01P 2001/026; F01L 5/06; F01L 5/045; F01L 15/16; F01L 7/04
USPC ......... 123/241, 188.5, 312, 48 R, 48 C, 78 R, 123/78 C, 65 VA, 65 VS, 65 P
See application file for complete search history.

(56) References Cited

U.S. PATENT DOCUMENTS

| 741,824 | A | 10/1903 | Pehrsson |
|---|---|---|---|
| 1,167,023 | A | 1/1916 | Schmidt |
| 1,639,477 | A | 8/1926 | Theodore |
| 2,007,323 | A * | 7/1935 | Bernard .................. F01L 5/06 123/65 VA |
| 2,142,466 | A | 1/1939 | Wagner |
| 2,344,993 | A | 3/1944 | Lysholm |
| 2,467,568 | A | 4/1949 | Rosaen |
| 2,769,433 | A | 11/1956 | Humphreys |
| 2,883,974 | A | 4/1959 | Heising |
| 3,964,452 | A | 6/1976 | Nakamura |
| 4,033,304 | A | 7/1977 | Luria |
| 4,187,808 | A | 2/1980 | Audoux |
| 4,487,172 | A | 12/1984 | Suhre |
| 4,516,537 | A | 5/1985 | Nakahara |
| 4,798,184 | A | 1/1989 | Palko |
| 5,003,936 | A | 4/1991 | Scherer |

(Continued)

FOREIGN PATENT DOCUMENTS

| GB | 190914629 A | 0/1910 |
|---|---|---|
| GB | 190918140 A | 0/1910 |

*Primary Examiner* — Lindsay Low
*Assistant Examiner* — Grant Moubry

(57) ABSTRACT

A variable volume combustion chamber system for a four-cycle internal combustion engine features an engine having a cylindrical combustion chamber inside. An intake port and an exhaust port are located on a chamber side wall. An ignition plug port and a tangentially-mounted fuel injection port are also located on the chamber side wall. A cylindrical piston is pivotally located on a connecting rod in the combustion chamber. The system features an adjustable volume head assembly located on a chamber top featuring a solenoid connected to a cylindrical head and sleeve component via a positioning shaft. The cylindrical head and sleeve component adjustably extends through the chamber top into the combustion chamber and is movable via actuation of the solenoid.

4 Claims, 5 Drawing Sheets

(Cross-sectional View Intake Stroke)

(56) References Cited

U.S. PATENT DOCUMENTS

| | | |
|---|---|---|
| 5,054,438 A | 10/1991 | Takashima |
| 5,341,771 A | 8/1994 | Riley |
| 7,559,298 B2 * | 7/2009 | Cleeves ................... F01L 5/06 123/188.5 |
| 7,921,817 B2 * | 4/2011 | Cleeves ................... F01L 5/06 123/188.5 |
| 2010/0192916 A1 * | 8/2010 | Turner ..................... F01L 5/06 123/48 C |
| 2012/0291756 A1 * | 11/2012 | Howard ................... F02D 15/04 123/48 D |

* cited by examiner (Cross-sectional View Intake Stroke)

(Cross-sectional View Compression Stroke)

(Cross-sectional View Power Stroke)

(Cross-sectional View Exhaust Stroke)

(Cross-sectional View Top Port Opening)

VARIABLE VOLUME COMBUSTION CHAMBER SYSTEM

CROSS REFERENCE

This application is a non-provisional of and claims priority to U.S. Provisional Patent Application No. 62/004,056, filed May 28, 2014, the specification(s) of which is/are incorporated herein in their entirety by reference.

FIELD OF THE INVENTION

The present invention relates to internal combustion engines, or more specifically, internal combustion engines having a variable volume combustion chamber with integral sleeve valve ports.

BACKGROUND OF THE INVENTION

It has long been known that increasing the compression ratio of an internal combustion engine increases its thermodynamic efficiency. It has also been long known that if the geometric volume ratio remains constant (i.e., a fixed volume combustion chamber), the pressure ratio is decreased, resulting in a mixture in the combustion chamber whose pressure is below that obtained at full throttle. One approach to restoring the full pre-combustion pressure (or achieving the desired pressure ratio) is to vary the volume of the combustion chamber.

Similarly, it has been long understood that sleeve valves are more efficient and less complex than traditional "poppet" valves.

Designs for variable volume combustion chambers are numerous. Likewise there are several designs for sleeve valves. The present invention integrates both concepts into one design to realize the cumulative benefits.

Sleeve Valve:

In 1908 Charles Knight invented the sleeve valve for use in internal combustion engines. The design had two cast-iron sleeves per cylinder, one sliding inside the other, with the piston inside the inner sleeve. The sleeves were operated by small connected rods actuated by an eccentric shaft and had ports cut out at their upper ends. The cylinder head was like a fixed piston, with its own set of rings projecting down inside the inner sleeve. The heads were individually detachable for each cylinder. The design allowed a more central location for the spark plugs, large ports for better gas flow, and hemispherical combustion chambers that in turn gave increased power. In addition, the sleeve valves required much less maintenance than poppet valves, which needed adjustment, grinding, and even replacement after a few thousand miles.

The sleeve valve concept was also envisaged by Peter Burt (Letter Patent No GB 190,918,140) and James McCollum (Patent No GB 190,914,629).

There have been several variations of the Knight invention over the years. U.S. Pat. No. 4,487,172A is a typical example. It is a single-sleeve valve engine with narrow quasi-elliptic sleeve motion that improves exhaust and intake valving and permits the conversion of standard engine blocks. The sleeve is thick walled, and is molded of low density material which permits significant rounding of the sleeve apertures for better flow, and grooves and rings for oil control, gas leakage reduction, and mass reduction. The sleeve has an extension which projects above the head and is connected to a half-speed crankshaft by means of a connecting rod. This connecting rod is restrained at an intermediate point by a radius rod to obtain quasi-elliptic sleeve motion which has an amplitude approximately half as great circumferentially as axially. In order to minimize emissions, provision is made for swirl, scavenging, multiple spark plugs, and a near ideal combustion chamber shape.

Variable Volume Combustion Chamber:

U.S. Pat. No. 741,824 by Pehrsson describes a 4-stroke, internal combustion engine with a cam operated exhaust valve and a vacuum operated intake valve, and with a main cylinder-diameter auxiliary piston used to manually vary the combustion chamber volume, to obtain the maximum pre-combustion pressure. The position of the auxiliary piston defines the limits of travel of the inlet valve.

In U.S. Pat. No. 1,167,023 by Schmidt, there is disclosed a conventional 4-stroke engine with an auxiliary cylinder and piston above the main cylinder, to vary the combustion chamber volume. The auxiliary piston position is controlled by a spring, and the load of combustion is taken up by hydraulic pressure. The position of the auxiliary piston is therefore dependent on the load, as the rate of supply and escape of oil from above the auxiliary piston (or the top half of it) is limited by the rate with which it can enter or escape through the oil ports. The outlet port has a valve that has a preset (and alterable) pressure relief system. If the combustion pressure exceeds this pressure, oil is forced out of the pressure chamber, and the auxiliary piston moves towards its outermost position, increasing the combustion chamber volume. When the load setting is decreased, and the combustion pressure is less than this value, oil is not released from the outlet, but still enters through the inlet check valve, resulting in the movement of the piston towards the main cylinder, and increasing the pre-combustion pressure.

Wilson discloses in U.S. Pat. No. 1,639,477 a conventional 4-stroke engine with an auxiliary cylinder and multiple crowned piston located above the working piston. The position of the auxiliary piston is controlled by the pressure in the intake manifold, via a second auxiliary piston, operated upon by hydraulic pressure. A spring is used to move the auxiliary piston to its outermost position when the engine is not running.

In U.S. Pat. No. 2,142,466 by Wagner a conventional 4-stroke compression ignition engine is described, with a throttled intake system and a variable volume combustion chamber. The auxiliary piston reciprocates, driven by the camshaft, whose timing is variable angularly.

In U.S. Pat. No. 2,344,993 by Lysholm there is disclosed a conventional 4-stroke spark or compression ignition engine with closure of the intake valve during the intake stroke, executing the Atkinson cycle. As the piston speed is high during valve closure, at high engine speeds the volumetric efficiency of the engine is reduced. If the intake valve were to be closed on the compression stroke instead, then the volumetric efficiency at high engine speeds would be increased, necessitating reducing it at low speeds. By closing the intake valve later on the induction stroke, and opening it very briefly on the compression stroke, the patent claims to produce a nearly constant volumetric efficiency, or that almost any desired curve of volumetric efficiency with engine speed can be tailored. On the compression ignition engine, the valve opening on the compression stroke can be the exhaust valve, as the fuel has not been injected as yet. The patent indicates that this is most suited to supercharged engines, thus in effect raising the efficiency to levels at or slightly above non-forced induction engines.

In U.S. Pat. No. 2,467,568 by Rosaen there is disclosed a conventional 4-stroke engine with a variable volume combustion chamber, controlled by hydraulic pressure. It appears that the auxiliary piston is filled with oil.

Humphreys discloses in U.S. Pat. No. 2,769,433 a conventional 2-stroke or 4-stroke engine with an auxiliary cylinder and piston located above the working piston. The auxiliary piston is backed by hydraulic fluid supplied by the engine's lubrication system. Oil can escape from the chamber at the back of the auxiliary piston if the maximum pressure achieved during combustion exceeds a preset value, which is enforced on the escape mechanism.

Heisling discloses in U.S. Pat. No. 2,883,974 a conventional 4-stroke engine with an auxiliary cylinder and piston located above the working piston, whose purpose is to provide a variable volume combustion chamber. The position of the auxiliary piston is controlled by hydraulic pressure, and it is also actuated by hydraulic pressure. A second embodiment utilizes a moving cylinder sleeve. Much of the emphasis of the invention is on the control mechanism to make the idea work.

In U.S. Pat. No. 3,964,452 by Nakamura an auxiliary cylinder and piston are located above a main cylinder and piston, and may communicate with them. A spring loaded piston may slide in the auxiliary cylinder, and does so after a certain preset high pressure is achieved during combustion. The primary purpose is to limit pressures and temperatures during combustion, and therefore increase thermal efficiency while ensuring that production of NO is limited. Lean charges lead to reduced CO and HC emissions, but they may also produce misfires and combustion fluctuations.

In U.S. Pat. No. 4,033,304 by Luria there is described an internal combustion engine that achieves constant pre-combustion pressure with a movable auxiliary piston and cylinder, wherein said piston is controlled by hydraulic means. The invention implements the Atkinson cycle with variable inlet valve timing. The inlet valve is held open past bottom dead center ("BDC") to vent the unwanted mixture back into the inlet tract. The auxiliary piston is spring loaded so that during the exhaust stroke, the auxiliary cylinder volume is at its least, thereby scavenging.

In U.S. Pat. No. 4,187,808 by Audoux there is disclosed a conventional 4-stroke engine, with an auxiliary piston and cylinder located above the main piston. The focus is on the hydraulic valving used to reduce any loads on the mechanical actuation of the auxiliary piston. With lowered pressure in the main cylinder, the auxiliary piston is designed to move inward towards the main cylinder, decreasing the volume of the combustion chamber, and assisting in scavenging burnt gases.

U.S. Pat. No. 4,516,537 by Nakahara discloses a conventional 4-stroke engine with an auxiliary cylinder and piston located in the head above the main piston and cylinder. The auxiliary piston is moved by hydraulic fluid under pressure. A major thrust of the invention is to construct a feasible means of controlling the auxiliary piston position, without having the excessive pressures from combustion having an impact on the oil pressure system, yet to distribute the load uniformly.

U.S. Pat. No. 4,798,184 by Palko discloses a 2-stroke or 4-stroke diesel engine where the intake valve is closed on the compression stroke to implement a greater expansion duration than compression. The valve actuation means is not described in any detail, and the patent indicates that it may be fixed or it may be variable during operation. The extended expansion allows combustion to occur at or after top dead center ("TDC"), reducing engine loads, and heat losses to the cooling system. The usual advantages to the expansion increase are more work produced by the expanding gases, and lower exhaust temperatures.

U.S. Pat. No. 5,003,936 discloses a variable volume cylinder where the cylinder head of the cylinder has arranged therein an insert whose position is hydraulically adjustable, the compression chamber being enlarged by lifting the insert, while it is reduced by lowering the insert. The position of the insert is controlled through a microprocessor in conjunction with a lambda probe.

U.S. Pat. No. 5,054,438 discloses a floating cylinder for a two cycle internal combustion engine providing a cylinder movably held within the cylinder block. The ports operation timing is controlled by a longitudinal movement of the cylinder.

U.S. Pat. No. 5,341,771 by Riley discloses a 2-stroke or 4-stroke engine where a hydraulically controlled auxiliary piston can be withdrawn to vary combustion chamber volume in response to engine load (idle to full). Traditional valves are used for intake and exhaust.

The present invention features a variable volume combustion chamber with an integral sleeve valve system for four-cycle combustion engines. The variable volume chamber is controlled via a microprocessor-controlled solenoid.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a variable volume combustion chamber with integrated sleeve valve ports for a four-cycle internal combustion engine. In some embodiments, the system comprises an engine having a cylindrical combustion chamber located therein. In some embodiments, the combustion chamber comprises an open chamber top and an open chamber bottom.

In some embodiments, an intake port is located on a chamber side wall fluidly connecting an intake manifold to the combustion chamber. In some embodiments, an intake valve is located next to the intake port for controlling airflow into the combustion chamber.

In some embodiments, an exhaust port is located on the chamber side wall opposite the intake port fluidly connecting an exhaust manifold to the combustion chamber. In some embodiments, an exhaust valve is located next to the exhaust port for controlling exhaust gas flow from the combustion chamber.

In some embodiments, an ignition plug port is located on the chamber side wall between the exhaust port and the chamber bottom. In some embodiments, a fuel injection port is tangentially located on the chamber side wall between the intake port and the chamber bottom.

In some embodiments, the system comprises a cylindrical piston pivotally located on a connecting rod via a rod anterior end. In some embodiments, the connecting rod is pivotally located on a crank via a rod posterior end. In some embodiments, the piston is located in the combustion chamber.

In some embodiments, the system comprises an adjustable volume head assembly located on the chamber top. In some embodiments, the adjustable volume head comprises a solenoid having an electro-magnet and an electro-magnet module control.

In some embodiments, the cylindrical head and sleeve component comprises a planar head located over and affixed to a hollow cylindrical sleeve. In some embodiments, the hollow cylindrical sleeve comprises a first port located on a sleeve wall and a second port located on a sleeve wall opposed to the first port. In some embodiments, the positioning shaft is perpendicularly affixed to the cylindrical head and sleeve component. In some embodiments, the cylindrical head and sleeve component adjustably extends through the chamber top into the combustion chamber and is movable via actuation of the solenoid.

DESCRIPTION OF PREFERRED EMBODIMENTS

Figure 1:
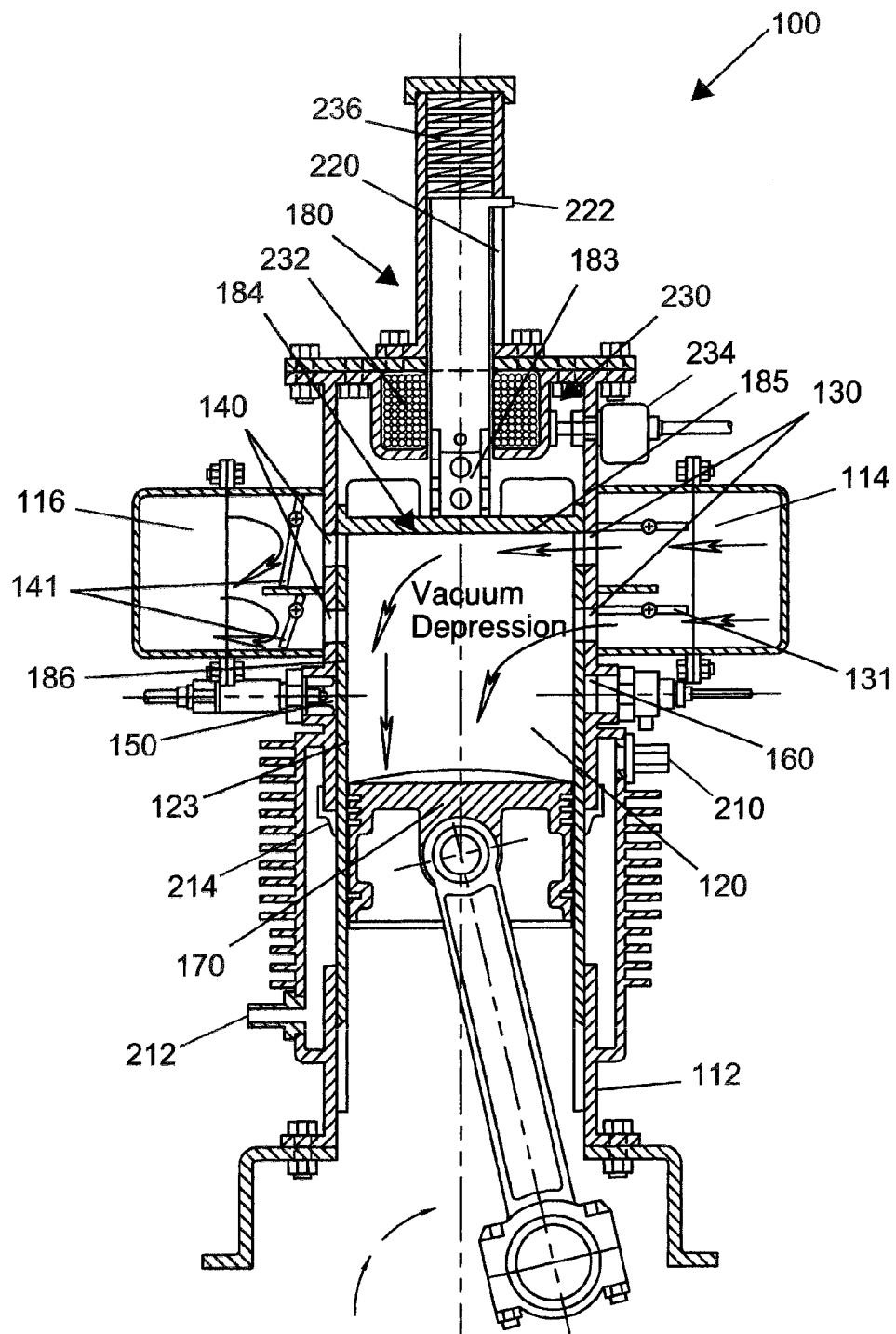
FIG. 1 shows a cross-sectional view of the present invention during an intake stroke.

Following is a list of elements corresponding to a particular element referred to herein:
100 Variable volume combustion chamber system
112 Engine side wall
114 Intake manifold
116 Exhaust manifold
120 Combustion chamber
121 Chamber top
122 Chamber bottom
123 Chamber side wall
130 Intake port
131 Intake valve
140 Exhaust port
141 Exhaust valve
150 Ignition plug port
151 Spark plug
160 Fuel injection port
161 Fuel injector
170 Piston
180 Head assembly
183 Positioning shaft
184 Head and sleeve component
185 Head
186 Sleeve
191 First port
192 Second port
193 Third port
194 Fourth port
210 Coolant inlet
212 Coolant outlet
214 Wiper ring
220 Cylinder track slot
222 Cylinder track guide and limit stop pin
230 Solenoid
232 Electro-magnet
234 Electro-magnet module control
236 Spring Referring now to FIGS. 1-5, the present invention features a variable volume combustion chamber system (100) for a four-cycle internal combustion engine. In some embodiments, the system (100) comprises an engine having a cylindrical combustion chamber (120) located therein.

In some embodiments, the combustion chamber (120) comprises an open chamber top (121) and an open chamber bottom (122). In some embodiments, an intake port (130) is located on a chamber side wall (123) fluidly connecting an intake manifold (114) to the combustion chamber (120). In some embodiments, an intake valve (131) is located next to the intake port (130) for controlling airflow into the combustion chamber (120). In some embodiments, an exhaust port (140) is located on the chamber side wall (123) opposite the intake port (130) fluidly connecting an exhaust manifold (116) to the combustion chamber (120). In some embodiments, an exhaust valve (141) is located next to the exhaust port (140) for controlling exhaust gas flow from the combustion chamber (120).

In some embodiments, an ignition plug port (150) having an ignition plug located therein is located on the chamber side wall (123) between the exhaust port (140) and the chamber bottom (122). In some embodiments, a tangentially-mounted fuel injection port (160) having a fuel injector (161) located therein is located on the chamber side wall (123) between the intake port (130) and the chamber bottom (122).

In some embodiments, the system (100) comprises a cylindrical piston (170) having a top surface. In some embodiments, the piston (170) is pivotally located on a connecting rod via a rod anterior end. In some embodiments, the connecting rod is pivotally located on a crank via a rod posterior end. In some embodiments, the piston (170) is slidably located in the combustion chamber (120).

In some embodiments, the system (100) comprises an adjustable volume head assembly (180) located on the chamber top (121). In some embodiments, the adjustable volume head comprises a microprocessor-controlled solenoid (230) statically located on a bottom surface thereon actuatingly connected to a cylindrical head and sleeve component (184) via a positioning shaft (183). In some embodiments, the cylindrical head and sleeve component (184) comprises a planar head (185) perpendicularly located on and affixed to a hollow cylindrical sleeve (186). In some embodiments, the sleeve comprises a first port (191) located thereon and a second port (192) located thereon opposed to the first port (191). In some embodiments, the positioning shaft (183) is perpendicularly affixed to the cylindrical head and sleeve component (184). In some embodiments, the cylindrical head and sleeve component (184) adjustably extends through the chamber top (121) into the combustion chamber (120) and is positionable via actuation of the solenoid (230). In some embodiments, the piston (170) fits into and operates within the cylindrical head and sleeve component (184).

In some embodiments, the system (100) comprises an adjustable volume head assembly (180) located on the chamber top (121). In some embodiments, adjustable volume head assembly (180) comprises an actuatingly positionable cylindrical head and sleeve component (184) having a planar head (185) perpendicularly located on and affixed to a hollow cylindrical sleeve (186). In some embodiments, the sleeve component (184) comprises a first port (191) located thereon and a second port (192) located thereon opposed to the first port (191). In some embodiments, the positioning shaft (183) is perpendicularly affixed to and extends out and away from the cylindrical head and sleeve component (184). In some embodiments, the cylindrical head and sleeve component (184) adjustably extends through the chamber top (121) into the combustion chamber (120). In some embodiments, the piston (170) fits into and operates within the cylindrical head and sleeve component (184).

In some embodiments, the system (100) comprises a microprocessor-controlled solenoid (230) assembly having an electro-magnet (232) located on a stationary component of the adjustable volume head assembly (180) and an electro-magnet module control (234) located on the engine side wall (112). In some embodiments, the cylindrical head and sleeve component (184) is positionable via actuation of the solenoid (230).

In some embodiments, the cylindrical head and sleeve component (184) is locked into position with sufficient magnetic force to hold the cylindrical head and sleeve component (184) stationary to the completion of the power stroke. In some embodiments, the location of the electro-magnet (232) is such that the core is in total contact at all times for maximum magnetic force. In some embodiments, upon completion of the power stroke the electro-magnet (232) is de-magnetized and the polarity is reversed with magnetic flux in the direction of elevation made for exhaust-intake event. In some embodiments, the cylindrical head and sleeve component (184) elevates to stop limit and remains energized to the completion of the intake at which time reverse polarity occurs and the cylindrical head and sleeve component (184), with the aid of the spring (236), descends for the compression stroke and remains energized until completion of the power stroke.

In some embodiments, the microprocessor-controlled solenoid (230) has sufficient magnetic force to hold the floating cylinder in either the up position (during exhaust and intake strokes) or in the down position (during compression and power strokes). Each position is achieved via magnetization, de-magnetization, and reverse polarity.

In some embodiments, during operation of the variable volume combustion chamber system (100) for a four-cycle internal combustion engine, for an intake stroke, the cylindrical head and sleeve component (184) is static in an upward position toward the chamber top (121) and held via actuation of the solenoid (230). In some embodiments, the first port (191) is aligned with the exhaust port (140). In some embodiments, the second port (192) is aligned with the intake port (130). In some embodiments, the intake valve (131) is open. In some embodiments, air flows into the combustion chamber (120). In some embodiments, the exhaust valve (141) is closed. In some embodiments, the ignition plug port (150) and the fuel injection port (160) are blocked by the sleeve (186). In some embodiments, the piston (170) is moving downward away from the chamber top (121). In some embodiments, upon the piston (170) reaching a downward most position with respect to the chamber top (121), the solenoid is actuated to move the cylindrical head and sleeve component (184) toward a downward position away from the chamber top (121).

In some embodiments, during operation of the variable volume combustion chamber system (100) for a four-cycle internal combustion engine, for a compression stroke, the cylindrical head and sleeve component (184) is static in a downward position away from the chamber top (121), held via actuation of the solenoid (230) magnetic field. In some embodiments, the first port (191) is aligned with the ignition plug port (150). In some embodiments, the second port (192) is aligned with the fuel injection port (160). In some embodiments, the intake valve (131) is open. In some embodiments, the exhaust valve (141) is open. In some embodiments, air flows through the combustion chamber (120) for cooling. In some embodiments, the piston (170) is moving upward toward the chamber top (121). In some embodiments, as the piston (170) is reaching an upper most position with respect to the chamber top (121) the tangentially-positioned fuel injector (161) injects fuel in a swirl pattern into the combustion chamber (120) just before the ignition plug fires.

In some embodiments, during operation of the variable volume combustion chamber system (100) for a four-cycle internal combustion engine, for a power stroke, the cylindrical head and sleeve component (184) remains static in a downward position away from the chamber top (121), held via actuation of the solenoid (230) magnetic field. In some embodiments, the first port (191) is aligned with the ignition plug port (150). In some embodiments, the second port (192) is aligned with the fuel injection port (160). In some embodiments, the intake valve (131) is open. In some embodiments, the exhaust valve (141) is open. In some embodiments, air flows through the intake port (130) through the combustion chamber (120) above the cylindrical head and sleeve component (184) though the exhaust port (140) for cooling. In some embodiments, the piston (170) is moving downward away from the chamber top (121).

In some embodiments, during operation of the variable volume combustion chamber system (100) for a four-cycle internal combustion engine, for an exhaust stroke, the cylindrical head and sleeve component (184) is static in an upward position toward the chamber top (121), and held via actuation of the solenoid (230). In some embodiments, the first port (191) is aligned with the exhaust port (140). In some embodiments, the second port (192) is aligned with the intake port (130). In some embodiments, the intake valve (131) is closed. In some embodiments, the exhaust valve (141) is open. In some embodiments, exhaust gas flows from the combustion chamber (120). In some embodiments, the piston (170) is moving upward toward the chamber top (121).

In some embodiments, the variable volume combustion chamber system (100) for a four-cycle internal combustion engine eliminates a traditional system of intake and exhaust poppet valves, increases power without increasing stroke, increases volumetric efficiency, simplifies cooling, and increases efficiency. In some embodiments, the tangentially-mounted fuel injectors (161) introduce the fuel in a swirl pattern into the fuel-air mixture thus creating more uniform mixing for the combustion stoke.

In some embodiments, a third port (193) is located on a sleeve (186) beneath the first port (191). In some embodiments, for an intake stroke, the third port (193) is aligned with a second exhaust port (140). In some embodiments, for a compression stroke, the third port (193) is blocked by an engine side wall (112). In some embodiments, for a power stroke, the third port (193) is blocked by the engine side wall (112). In some embodiments, for an exhaust stroke, the third port (193) is aligned with the second exhaust port (140).

In some embodiments, a fourth port (194) is located on the sleeve (186) beneath the second port (192). In some embodiments, for an intake stroke, the fourth port (194) is aligned with a second intake port (130). In some embodiments, for a compression stroke, the fourth port (194) is blocked by an engine side wall (112). In some embodiments, for a power stroke, the fourth port (194) is blocked by the engine side wall (112). In some embodiments, for an exhaust stroke, the fourth port (194) is aligned with the second intake port (130).

In some embodiments, a lubricating cooling system is located on the engine side wall (112). In some embodiments, the lubricating cooling system comprises a coolant inlet (210) and a coolant outlet (212) each fluidly connected to a coolant chamber. In some embodiments, sleeve (186) is directly exposed to the lubricating coolant employed in the lubricating cooling system. In some embodiments, a wiper ring (214) scrapes the sleeve (186) to prevent unwanted entry into the combustion chamber (120). In some embodiments, the lubricating coolant is oil. In some embodiments, the lubricating coolant is oil-based. In some embodiments, the lubricating coolant is water based.

In some embodiments, the head assembly (180) comprises a chamber housing the positioning shaft (183). In some embodiments, a cylinder track guide and limit stop pin (222) is located on a side of the positioning shaft (183). In some embodiments, the cylinder track guide and limit stop pin (222) extends through a cylinder track slot (220) located on a side wall of the chamber housing. In some embodiments, a spring (236) is located in a sealed top of the chamber housing and interfaces with the positioning shaft (183) to provide a spring bias towards the piston. In some embodiments, a spring (236) is located in a sealed top of the chamber housing and interfaces with the positioning shaft (183) to provide a spring bias away from the piston.

DISCUSSION: The variable volume combustion chamber system with integral sleeve valve ports (a.k.a., "floating cylinder") is designed for use in four stroke (four-cycle), reciprocating engines. It is most appropriate for diesel aircraft engine applications although it can be applied elsewhere as well. It incorporates a computer controlled, solenoid driven, movable section of the cylinder that allows the cylinder volume to change at various steps of the cycle. The design eliminates the traditional system of intake and exhaust poppet valves and replaces them with a system of staggered intake and exhaust ports. These ports have direct opening to the combustion and exhaust chambers. There is no carburation or ducting but ambient air from a plenum flows through the ports for combustion or across the top of the cylinder head for cooling. Fuel injection similar to that found in diesel technology is used.

The "floating cylinder" is computer controlled and powered by a solenoid with the core of the cylinder attached vertically to the bottom of the cylinder in order to provide vertical travel. During the exhaust and intake cycles the solenoid remains activated in order to hold the floating portion of the cylinder up until completion of the intake cycle. Also during the exhaust and intake cycles, upper and lower ports are positioned directly across from the exhaust and intake manifolds (114). When polarity to the solenoid coil is reversed, the cylinder lowers and locks in retention via the solenoid magnetic field for the compression and power cycles. When the cylinder is in the locked position, the upper port is positioned directly under the spark plug (151) and under the fuel injector (161) on the exhaust side. The lower port is sealed.

Figure 2:
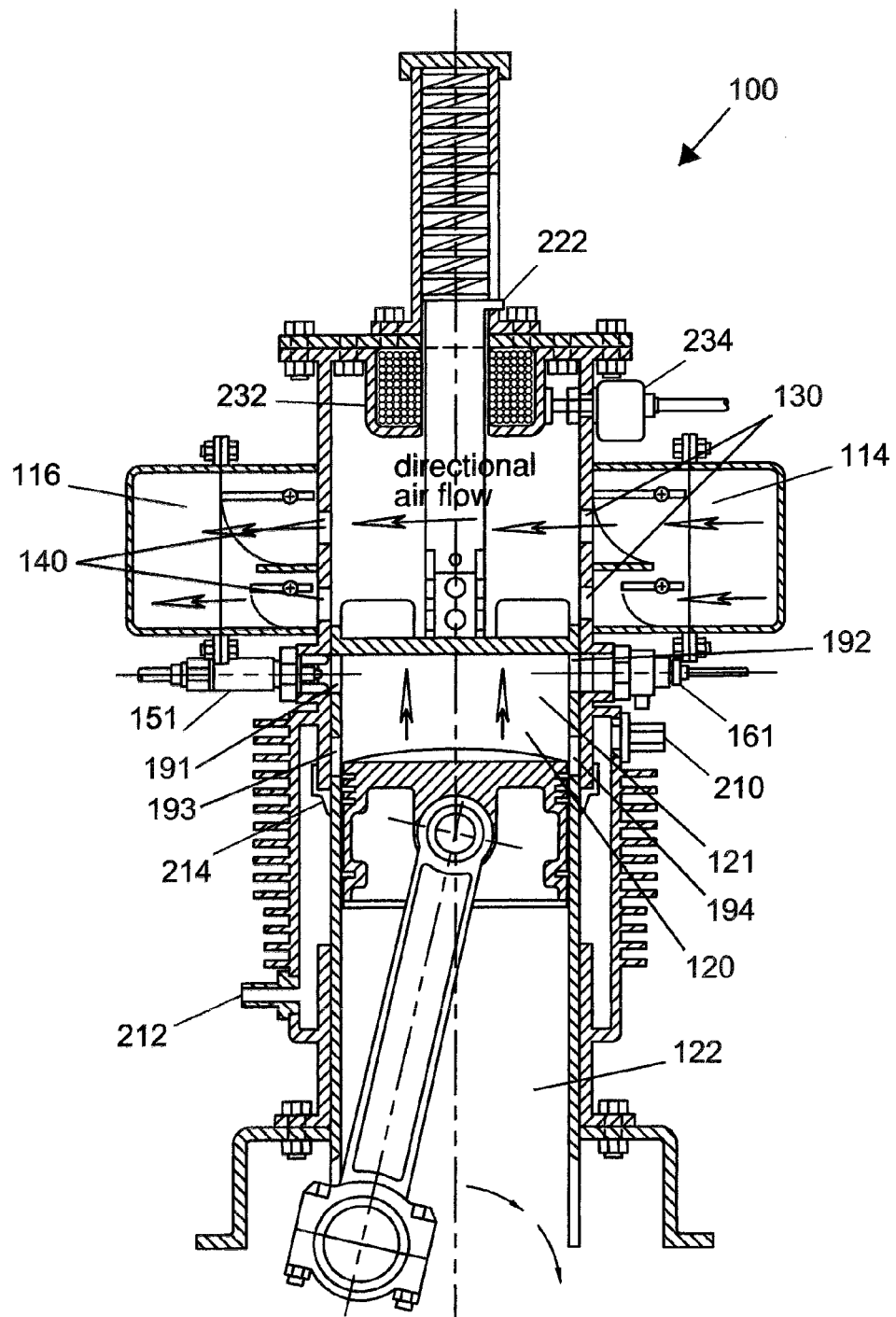
FIG. 2 shows a cross-sectional view of the present invention during a compression stroke.

Intake: FIG. 2 shows the piston as it nears the bottom on its intake stroke and the floating (upper) portion of the cylinder in the elevated position and held there by the energized solenoid. At this point all ports of the floating portion of the cylinder are aligned with (open to) the intake manifold (114) and exhaust manifold (116). The movement of the piston to the intake position causes the intake flappers to open and the exhaust flappers to close. Air is forced into the cylinder through the intake port. (Of note, by taking in air with the cylinder at the effective maximum volume, there is a significant increase of power without increase of stroke.) When the piston reaches bottom dead center (BDC), the polarity of the solenoid holding the floating portion of the cylinder in place is reversed and the floating cylinder lowers thus closing off both the intake and exhaust ports. As the floating cylinder lowers, the compression cycle begins.

Figure 3:
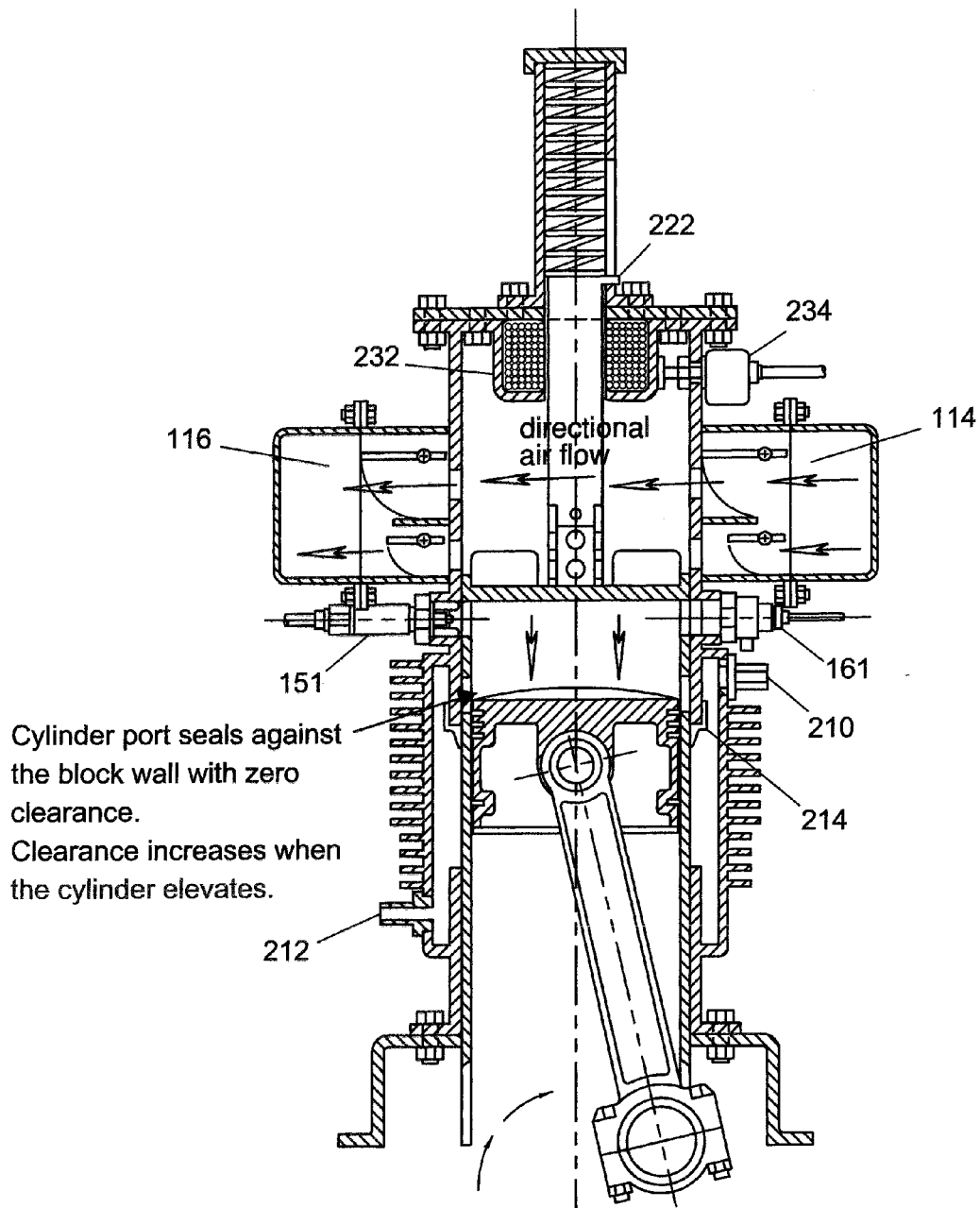
FIG. 3 shows a cross-sectional view of the present invention during a power stroke.
Figure 4:
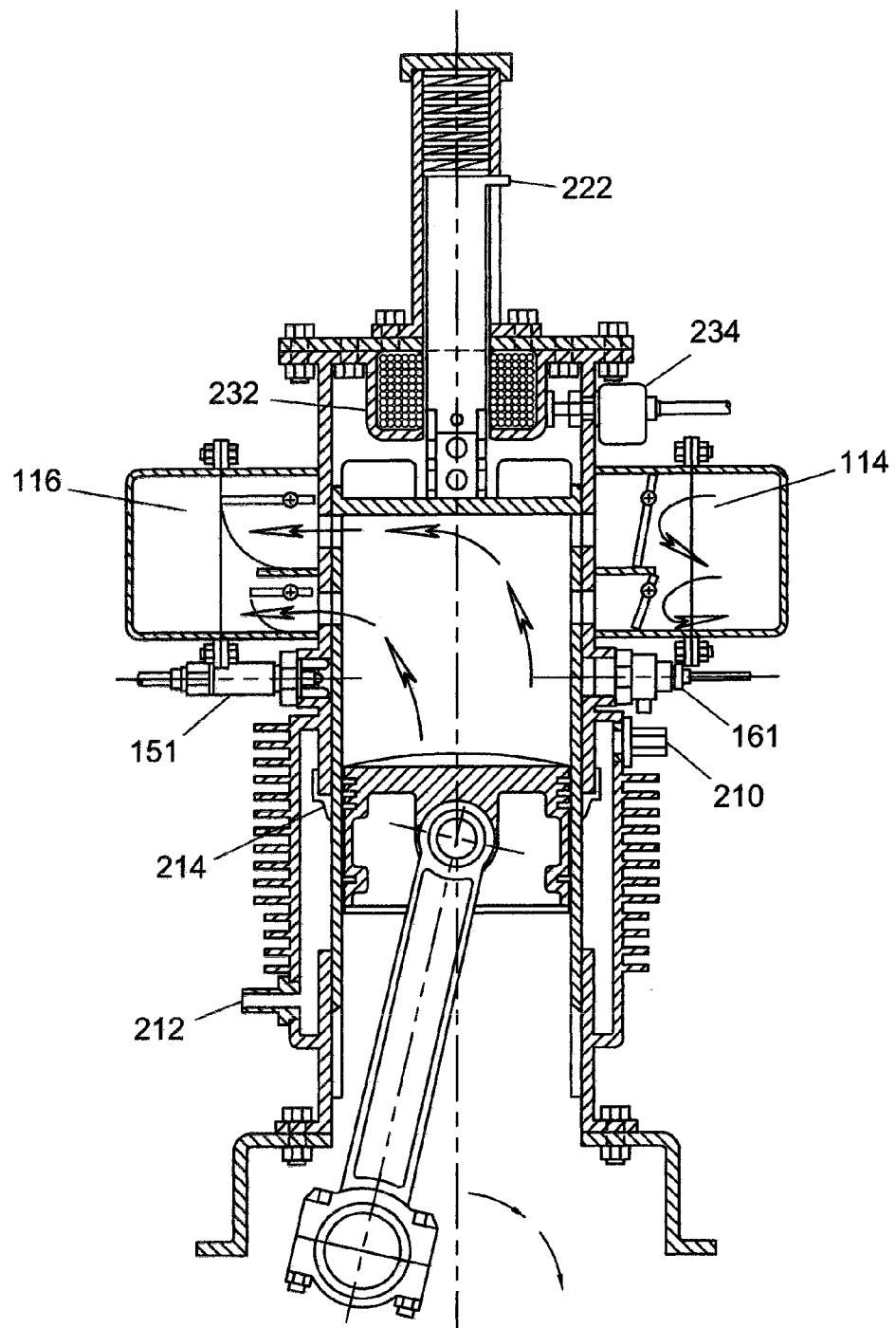
FIG. 4 shows a cross-sectional view of the present invention during an exhaust stroke.
Figure 5:
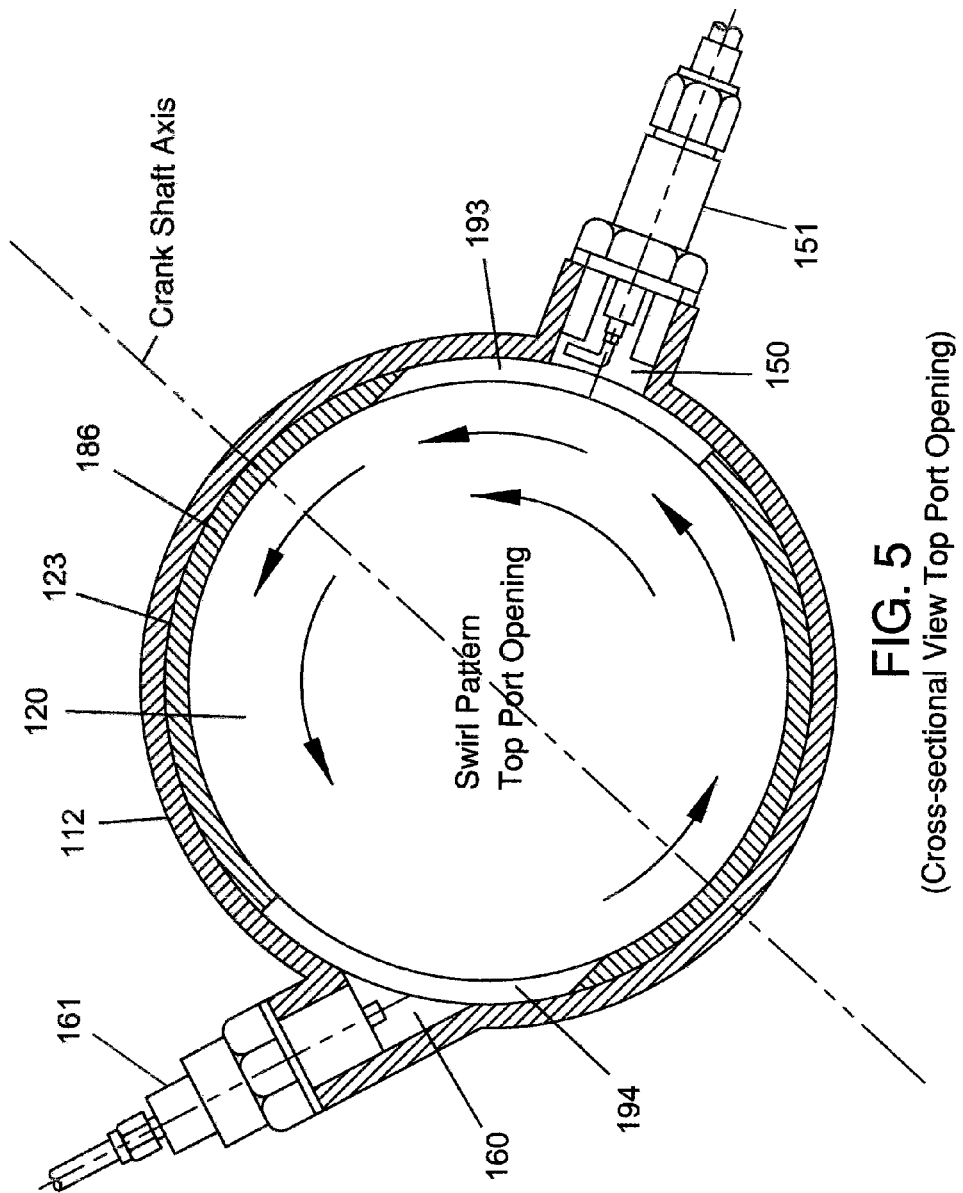
FIG. 5 shows a tangential mounted fuel injector discharging laterally into the combustion chamber of the present invention.

Compression: FIG. 3 shows the floating cylinder locked in place using a combination of solenoid-imposed magnetic force and the piston about to reach top dead center (TDC). When the floating cylinder locks in place, the upper ports align with the spark plug (151) and the fuel injector (161) while the bottom ports are sealed off against the fixed portion of the cylinder wall. Fuel is injected in a swirl pattern into the chamber via the tangentially positioned fuel injection port as the piston begins to travel up and spark is initiated at (or about) TDC. (See Note A for a more detailed description of the mechanical locking mechanism).

Power: When spark is initiated, the compressed fuel air mixture rapidly expands, forcing the piston back down towards BDC. The floating portion of the cylinder remains locked in the down position during this cycle. (See FIG. 4) (Of note in both the compression and power cycles the intake manifold (114) and exhaust manifold (116) are open to each other providing cooling to the cylinder).

Exhaust: As the piston is about to reach BDC from the power stroke; the floating cylinder solenoid polarity is once again reversed thus returning the floating cylinder to the up position. In the up position, the intake and exhaust ports align with the intake manifold (114) and exhaust manifold (116). As the piston begins to travel upward, the intake flapper close and the exhaust flapper open allowing the combustion residuals to escape into the exhaust chamber. (See FIG. 5).

In some embodiments, the cylinder port seals against the block wall with zero clearance. In some embodiments, clearance increases when the cylinder elevates.

Note A: The "floating cylinder" locking philosophy is based on the premise that sufficient magnetic force will be generated at the point of combustion to hold the floating cylinder stationary to the completion of the power stroke thereby eliminating the need for lock-down of the floating cylinder during the power stroke. The location of the electromagnet is such that the core in total contact at all times for maximum magnetic force. This design permits sufficient latitude for the design of any electro-magnet with adequate magnetic force to restrain the cylinder during the power stroke. Upon completion of the power stroke the electro-magnet is de-magnetized and polarity is reversed with magnetic flux in direction of elevation made for exhaust-intake event. Cylinder elevates to stop limit and remains energized to the completion of the intake at which time reverse polarity occurs and the cylinder, with the aid of the dampening spring, descends for the compression stroke and remains energized until completion of the power stroke.

ADVANTAGES: The present invention increases power without increasing stroke. For example, if the un-boosted displacement of an engine is 75.6 in$^3$, 4.5 stroke, with 7 to 1 compression ratio producing 32.75 BHP, allowing the cylinder to rise 3 inches creates an additional 50.4 in$^3$ for 126.0 in$^3$ total at the start of the compression stroke. The normal compression ratio of 7:1 is boosted to 11.6:1 and the HP increased to 54.6. This equates to a 60% increase in power without increasing the stroke.

The system of intake and exhaust ports replaces traditional valves; increasing port area approximately 2.5× as designed.

Changing the timing of the port closure can vary the manifold pressure.

Power recovery from the "blow down" effect results in power produced equal to turbo-charger: In "conventional" engines opening of the exhaust valves usually occurs at approximately 60 degrees before bottom dead center (BBDC) which means a considerable amount of pressure energy is used to expel the exhaust for more complete scavenging. This is primarily due to the limited size of the exhaust openings found in conventional engines. If the exhaust opening occurred at BDC instead of 60 degrees BBDC, the remaining exhaust would require power from an adjacent cylinder for complete exhaustion. This "blow down" energy does not furnish useful torque. With the floating cylinder design, exhaust opening would occur at BDC thus increasing usable torque. Exhaust opening creates a 50.4 in volume that lowers the pressure and temperature. The increased area of the exhaust port eliminates previously mentioned "blow down" effect.

Higher volumetric efficiency due to "ram-air intake".

Simplifies cooling due to high volume intake manifold (114) and exhaust manifold (116).

Eliminates carburation by direct fuel injection.

The present invention easily incorporates tangential mount for fuel injectors (161). By so doing, the fuel in injected laterally into the combustion chamber thus creating a swirl pattern that insures a more even fuel-air mixture throughout the chamber. This contributes to a uniform rate of combustion and flame front propagation. This results in a more efficient combustion cycle.

Increases efficiency by eliminating work and friction encountered in traditional "poppet valve" system.

A variable volume cylinder containing a computer controlled, solenoid driven, movable section of the cylinder that allows the cylinder volume to change at various steps of a four-stroke reciprocating engine. Varying the cylinder volume boosts the compression ratio, thus increasing power without increasing the piston stroke. The moving cylinder contains large staggered intake and exhaust ports that eliminate the traditional system of intake and exhaust poppet valves. These ports have direct opening to the combustion and exhaust chambers. Exhaust opening occur at bottom dead center (BDC) thus increasing usable torque. The increased area of the exhaust port eliminates previously mentioned "blow down" effect. There is no carburation or ducting; but ambient air from a plenum flows through the ports for combustion or across the top of the cylinder head for cooling.

A beneficial spin-off of the solenoid-based lockdown design allows the floating cylinder to become safety mechanism protecting the engine from abnormal combustion. If detonation should occur, the explosive force could be greater than the normal hold-down force and cylinder would rise and increase the volume. This increase of volume would reduce the total pressure of detonation, and with reduction of detonation pressure the cylinder would return to normal position for the power stroke.

As used herein, the term "about" refers to plus or minus 10% of the referenced number.

The disclosures of the following U.S. patents are incorporated in their entirety by reference herein: Patent No. GB 190,918,140; Patent No. GB 190,914,629; U.S. Pat. No. 741, 824; U.S. Pat. No. 1,167,023; U.S. Pat. No. 1,639,477; U.S. Pat. No. 2,142,466; U.S. Pat. No. 2,344,993; U.S. Pat. No. 2,467,568; U.S. Pat. No. 2,769,433; U.S. Pat. No. 2,883,974; U.S. Pat. No. 3,964,452; U.S. Pat. No. 4,033,304; U.S. Pat. No. 4,187,808; U.S. Pat. No. 4,487,172 A; U.S. Pat. No. 4,516,537; U.S. Pat. No. 4,798,184; U.S. Pat. No. 5,003,936; U.S. Pat. No. 5,054,438; and U.S. Pat. No. 5,341,771.

Various modifications of the invention, in addition to those described herein, will be apparent to those skilled in the art from the foregoing description. For example it would be quite simple to install a second electro-magnet on top of the cylinder head with the polarity remaining the same for either magnet thus eliminating polarity reversal. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A variable volume combustion chamber system (100) for a four-cycle internal combustion engine, wherein the system (100) comprises:
   (a) an engine having a cylindrical combustion chamber (120) disposed therein, wherein the combustion chamber (120) comprises an open chamber top (121) and an open chamber bottom (122), wherein an intake port (130) is disposed on a chamber side wall (123) fluidly connecting an intake manifold (114) to the combustion chamber (120), wherein an intake valve (131) is disposed adjacent to the intake port (130) for controlling airflow into the combustion chamber (120), wherein an exhaust port (140) is disposed on the chamber side wall (123) opposite the intake port (130) fluidly connecting an exhaust manifold (116) to the combustion chamber (120), wherein an exhaust valve (141) is disposed adjacent to the exhaust port (140) for controlling exhaust gas flow from the combustion chamber (120), wherein an ignition plug port (150) having an ignition plug disposed therein is disposed on the chamber side wall (123) between the exhaust port (140) and the chamber bottom (122), wherein a tangentially-mounted fuel injection port (160) having a fuel injector (161) disposed therein is disposed on the chamber side wall (123) between the intake port (130) and the chamber bottom (122);
   (b) a cylindrical piston (170) having a top surface, wherein the piston (170) is pivotally disposed on a connecting rod via a rod anterior end, wherein the connecting rod is pivotally disposed on a crank via a rod posterior end, wherein the piston (170) is slidably disposed in the combustion chamber (120);
   (c) an adjustable volume head assembly (180) disposed on the chamber top (121), wherein adjustable volume head assembly (180) comprises an actuatingly positionable cylindrical head and sleeve component (184) having a planar head (185) perpendicularly disposed on and affixed to a hollow cylindrical sleeve (186), wherein the sleeve component (184) comprises a first port (191) disposed thereon and a second port (192) disposed thereon opposed to the first port (191), wherein the positioning shaft (183) is perpendicularly affixed to and extends out and away from the cylindrical head and sleeve component (184), wherein the cylindrical head and sleeve component (184) adjustably extends through the chamber top (121) into the combustion chamber (120), wherein the piston (170) fits into and operates within the cylindrical head and sleeve component (184); and (d) a microprocessor-controlled solenoid assembly comprising a solenoid (230) having an electro-magnet (232) disposed on a stationary component of the adjustable volume head assembly (180) and an electro-magnet module control (234) disposed on an engine side wall (112), wherein the cylindrical head and sleeve component (184) is positionable via actuation of the solenoid (230);

wherein the cylindrical head and sleeve component (184) is locked into position with sufficient magnetic force to hold the cylindrical head and sleeve component (184) stationary to completion of a power stroke, wherein a location of the electro-magnet (232) is such that a core is in total contact at all times for maximum magnetic force, wherein upon completion of the power stroke the electro-magnet (232) is de-magnetized and a polarity is reversed with magnetic flux in a direction of elevation made for exhaust-intake event, wherein the cylindrical head and sleeve component (184) elevates to stop limit and remains energized to completion of an intake at which time reverse polarity occurs and the cylindrical head and sleeve component (184), with aid of a spring (236), descends for a compression stroke and remains energized until completion of the power stroke;

wherein during operation of the variable volume combustion chamber system (100) for a four-cycle internal combustion engine, for an intake stroke, the cylindrical head and sleeve component (184) is static in an upward position toward the chamber top (121) and held via actuation of the solenoid (230), the first port (191) is aligned with the exhaust port (140), the second port (192) is aligned with the intake port (130), the intake valve (131) is open, air flows into the combustion chamber (120), the exhaust valve (141) is closed, the ignition plug port (150) and the fuel injection port (160) are blocked by the sleeve (186), the piston (170) is moving downward away from the chamber top (121), upon the piston (170) reaching a downward most position with respect to the chamber top (121), the solenoid is actuated to move the cylindrical head and sleeve component (184) toward a downward position away from the chamber top (121);

wherein during operation of the variable volume combustion chamber system (100) for a four-cycle internal combustion engine, for the compression stroke, the cylindrical head and sleeve component (184) is static in the downward position away from the chamber top (121), held via actuation of the solenoid (230) and locked into position via a solenoid magnetic field, the first port (191) is aligned with the ignition plug port (150), the second port (192) is aligned with the fuel injection port (160), the intake valve (131) is open, the exhaust valve (141) is open, air flows through the combustion chamber (120) for cooling, the piston (170) is moving upward toward the chamber top (121), as the piston (170) is reaching an upper most position with respect to the chamber top (121) the fuel injector (161) injects fuel into the combustion chamber (120) then the ignition plug fires;

wherein during operation of the variable volume combustion chamber system (100) for a four-cycle internal combustion engine, for the power stroke, the cylindrical head and sleeve component (184) remains static in the downward position away from the chamber top (121), held via actuation of the solenoid (230) and locked into position via the solenoid magnetic field, the first port (191) is aligned with the ignition plug port (150), the second port (192) is aligned with the fuel injection port (160), the intake valve (131) is open, the exhaust valve (141) is open, air flows through the intake port (130) through the combustion chamber (120) above the cylindrical head and sleeve component (184) though the exhaust port (140) for cooling, the piston (170) is moving downward away from the chamber top (121);

wherein during operation of the variable volume combustion chamber system (100) for a four-cycle internal combustion engine, for an exhaust stroke, the cylindrical head and sleeve component (184) is static in the upward position toward the chamber top (121), and held via actuation of the solenoid (230), the first port (191) is aligned with the exhaust port (140), the second port (192) is aligned with the intake port (130), the intake valve (131) is closed, the exhaust valve (141) is open, exhaust gas flows from the combustion chamber (120), the piston (170) is moving upward toward the chamber top (121);

wherein the variable volume combustion chamber system (100) for a four-cycle internal combustion engine eliminates a traditional system of intake and exhaust poppet valves, increases power without increasing stroke, increases volumetric efficiency, simplifies cooling, and increases efficiency.

2. The system (100) of claim 1, wherein a third port (193) is disposed on the sleeve (186) beneath the first port (191), wherein for the intake stroke, the third port (193) is aligned with a second exhaust port (140), wherein for the compression stroke, the third port (193) is blocked by the engine side wall (112), wherein for the power stroke, the third port (193) is blocked by the engine side wall (112), and wherein for the exhaust stroke, the third port (193) is aligned with the second exhaust port (140).

3. The system (100) of claim 1, wherein a fourth port (194) is disposed on the sleeve (186) beneath the second port (192), wherein for the intake stroke, the fourth port (194) is aligned with the second intake port (130), wherein for the compression stroke, the fourth port (194) is blocked by the engine side wall (112), wherein for the power stroke, the fourth port (194) is blocked by the engine side wall (112), and wherein for an exhaust stroke, the fourth port (194) is aligned with the second intake port (130).

4. The system (100) of claim 1, wherein a lubricating cooling system is disposed on the engine side wall (112), wherein the lubricating cooling system comprises a coolant inlet (210) and a coolant outlet (212) each fluidly connected to a coolant chamber, wherein sleeve (186) is directly exposed to a lubricating coolant employed in the lubricating cooling system, wherein a wiper ring (214) scrapes the sleeve (186) to prevent unwanted entry into the combustion chamber (120).

* * * * *